United States Patent [19]

Schönig et al.

[11] Patent Number: 5,716,712
[45] Date of Patent: Feb. 10, 1998

[54] GLASS-CERAMIC ARTICLE DECORATED WITH CERAMIC COLORINGS AND METHOD FOR MAKING THE SAME

[75] Inventors: Dieter Schönig, Mainz; Dietmar Wennemann, Albig; Waldemar Weinberg, Seibersbach; Monica Cotlear de Witzmann, Nieder-Olm, all of Germany

[73] Assignee: Schott Glaswerke, Mainz, Germany

[21] Appl. No.: 504,746

[22] Filed: Jul. 20, 1995

[30] Foreign Application Priority Data

Jul. 23, 1994 [DE] Germany ............ 44 26 234.5

[51] Int. Cl.$^6$ .................................. B32B 17/00
[52] U.S. Cl. .................. 428/428; 428/67; 428/210; 428/432; 428/542.2; 428/701; 428/702
[58] Field of Search ................... 126/39 J, 39 F; 428/67, 410, 428, 432, 542.2, 701, 702, 210

[56] References Cited

U.S. PATENT DOCUMENTS

| | | | |
|---|---|---|---|
| 3,775,154 | 11/1973 | Grego | 427/372.2 |
| 3,816,161 | 6/1974 | Buckley | 427/287 |
| 4,277,522 | 7/1981 | Dorfield | 427/292 |
| 5,137,779 | 8/1992 | Hinz | 428/428 |
| 5,212,122 | 5/1993 | Pannhorst | 501/69 |
| 5,256,179 | 10/1993 | Crooker | 65/60.2 |
| 5,269,826 | 12/1993 | Leroux | 65/30.1 |
| 5,324,568 | 6/1994 | Coninx et al. | 428/195 |
| 5,409,742 | 4/1995 | Arfsten | 427/555 |
| 5,484,467 | 1/1996 | Nass | 428/67 |

FOREIGN PATENT DOCUMENTS

| | | |
|---|---|---|
| 565881 | 10/1993 | European Pat. Off. . |
| 3433880 | 3/1986 | Germany . |
| 3505922 | 10/1986 | Germany . |
| 3600109 | 7/1987 | Germany . |
| 4316575 | 7/1994 | Germany . |

*Primary Examiner*—Timothy Speer
*Attorney, Agent, or Firm*—Walter Ottesen

[57] ABSTRACT

A glass-ceramic article decorated with ceramic colorings has a first coloration layer over which at least a second coloration layer is arranged. The second coloration layer at least partially overlaps the first coloration layer. The first coloration layer can be applied as a base decor over a large area and be finely distributed on the surface of the glass-ceramic article. The base decor, for example, also protects the surface of the glass-ceramic article against scratches. The second coloration layer is colored differently and, as a marking decor, defines, for example, the cooking zones and facilitates the confusion-free recognition of the thereby individualized color function areas.

9 Claims, 3 Drawing Sheets

GLASS-CERAMIC ARTICLE DECORATED WITH CERAMIC COLORINGS AND METHOD FOR MAKING THE SAME

BACKGROUND OF THE INVENTION

Glass-ceramic articles find many applications such as oven-proof kitchen dishes which are stable with respect to changes in temperature. Glass-ceramic articles are especially used to provide a cooking surface for a cooking assembly.

These articles are generally provided with patterns or decorations which can be purely for aesthetic reasons or to mark cooking locations on cooking surfaces.

Enamel-based ceramic colorings are used for these decorations which are applied, according to conventional technology, for example, by utilizing the screen printing process or by decalcomania and are thereafter fired into the surface.

Such measures and glass compositions for decorating and glazing of glass ceramics are disclosed, for example, in U.S. patent application Ser. No. 08/029,364, filed Mar. 22, 1993, and German Patents 3,600,109; 3,505,922; and 3,433,880.

It is well known to make glass ceramic from a glass which can be converted (crystallized) to glass ceramic. This kind of glass has a composition as known, for example, from U.S. Pat. No. 5,212,122. The glass ceramic made from this kind of glass is then produced via a heat treatment in accordance with a specific temperature-time program wherein temperatures up to 1,000° C. can be reached.

Cooking surfaces for cooking assemblies with the cooking surface defined, for example, by ceramic glass or special glass are provided with a decor or pattern made of ceramic colorings on their surface. On the one hand, this decor serves to mark cooking zones ant therefore distinguishes between cold and hot areas of the cooking surface; on the other hand, the decor of the cooking surface fulfills an aesthetic function and makes it possible for the apparatus manufacturer to build up an independent product line which can be distinguished by applying individual design features.

At the present time, three variations of decorations of glass-ceramic cooking surfaces are made utilizing screen printing and are available in the marketplace as delineated below.

(1) Single-color monochrome decorations with suitable ceramic colors in the hot and cold areas by utilizing decor structures of the most varied degree of area and coverage.

(2) Single-color/multicolor decorations with suitable ceramic colors only for functional marking of the cooking surface such as the cooking zone boundary but also, for example, the residual heat display or corporate logos. The glass-ceramic surface remains mostly undecorated in the hot area as well as in the cold area.

(3) Multicolor decorations with suitable ceramic decor colors wherein a spacing must be maintained during printing between the different colors in order to prevent overlapping and crossover of the decors which would then, in accordance with views up to now, lead to flaking of the decor layer in practical use.

With respect to all cooking surfaces having these decor variations, traces showing use and fingerprints are often subject to complaint in those areas which are only sparsely decorated. These traces and fingerprints are very noticeable on substantially smooth gleaming surfaces and especially in display and sales rooms.

Glass-ceramic cooking surfaces are only sparsely decorated when they are provided, for example, only with cooking zone markings, residual heat displays and a corporate logo. For such glass-ceramic cooking surfaces, the apparatus under the cooking surfaces can, in particular cases, be visible to the viewer or user and disturb their aesthetic sensitivities. Such individual cases are given, for example, when halogen heating elements are used as well as intense lighting from above as, for example, in display rooms of kitchen studios.

Scatter-light coverings must be used in order to avoid the above unwanted effect or at least to reduce the same. The scatter-light covering is a dark color layer which is applied to the lower side of the plate defining the cooking surface and which allows no transparency. This problem too can be substantially resolved with the invention by a base decoration and thereby makes the complex coating of the lower side superfluous.

Furthermore, when a cooking surface is used for a longer time, the following can be noticeable and disturbing: use traces in the form of scratches, metal abrasion from pots and occasionally surface changes caused by unsuitable cleaning agents.

SUMMARY OF THE INVENTION

It is an object of the invention to improve a decorated cooking surface so that the noticeability of fingerprints and possible traces of usage and scratches is clearly reduced. It is a further object of the invention to provide effective protection of the glass ceramic with the decor against surface damage.

The glass-ceramic article of the invention is, for example, a glass-ceramic plate defining a cooking surface and includes: a glass-ceramic body; a first coloration layer on the body; and, a second coloration layer on the body which at least partially overlaps the first layer. The first coloration layer can be applied as a base decor over a large area on the upper surface of the glass-ceramic article. The first coloration layer, as a base decor, uniformly coats the article as a finely distributed dot raster and/or line raster and/or as graphic structured units in a repeating pattern thereof.

The first coloration layer is a base decor or pattern and can be applied to the entire cooking surface (cold and hot areas). This first coloration layer then covers the surface of the glass-ceramic article from 1% to 95% and in the hot area especially from 1% to 40%.

In order to maintain already present decoration variations and/or design lines and at the same time realize the advantages of this invention, it is recommended to match the colors of the first layer when used as the base decor to the color impression of the undecorated glass-ceramic article. That is, it is advantageous, for example, to provide the first coloration layer with a dark decor coloring in the case of cooking surfaces made from dark glass ceramic.

The originally smooth and gleaming cook surface now appears partially matte because of the uniformly fine distributed decor units and the different light reflections between the undecorated surface and the decor. In this way, the noticeability of fingerprints, pot scratches and other traces of use is very low.

A further embodiment of the invention comprises that the cook zones are clearly optically contrasted by a dispersion of the base decor. This first coloration layer exhibits a gradient in intensity because of a changing thickness and/or density of application on the surface of the glass-ceramic article. Because of this intensity gradient of the decoration, cooking zones can be marked without it being necessary to print on special rings or other line decor.

In a preferred embodiment of the invention, the additional coloration layer defines, as a marking decor, for example, the following: cooking zones, heat retaining zones, cold or work areas, display areas and residual heat displays and defines legends and/or symbols and/or other characterizations. By utilizing the additional coloration layer as a marking decor, this additional layer has another color than the base decor. The decors are arranged one atop the other especially in component regions of the surface of the glass-ceramic article.

The invention provides for the first time that the decors can be printed one atop the other without problems arising in the area of overlapping, for example, because of running, flaking or reduced adherence strength and resistance to abrasion. Application experiments are conducted to determine which ceramic decor colorings achieve the optimal results with pregiven production parameters for the particular later application. In this context, the decor colorings are considered for the coloration layers with respect to each other and with respect to the particular glass-ceramic substrate.

The invention also relates to a method for making a glass-ceramic article which is decorated with ceramic colorings. In this method, an article made of glass (which can be converted or crystallized to glass ceramic) is decorated with the ceramic colorings and the ceramic colorings are fired either during or after the crystallization to glass ceramic takes place. A first layer of ceramic coloring is applied to the surface of the glass-ceramic article and dried and thereafter an additional layer of ceramic coloring is applied over the first layer. The second coloration layer at least partially overlaps the first coloration layer. The coloration layers are applied by screen printing onto the glass-ceramic article.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
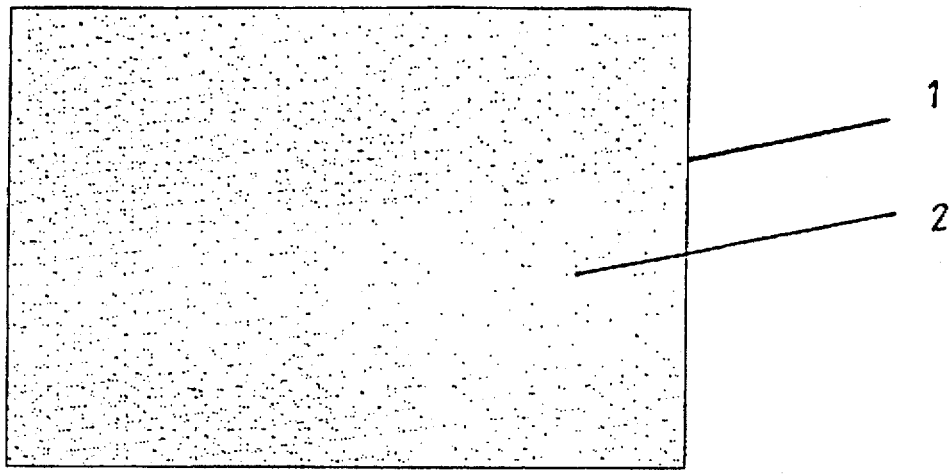
FIG. 1a is a plan view of a cooking surface having a first coloration layer applied thereto as a base decor.

FIG. 1a shows a cooking surface, for example, wherein the heating elements are electric. Here, reference numeral 1 identifies a plate made of conventional ceramic glass. A first coloration layer is applied by a first screen printing step and defines a base decor 2. The base decor 2 can have, for example, a fine raster pattern as is available, for example, from the Schott Company of Mainz, Germany, under the product designation "SR 326". The glass ceramic formed after the glass is crystallized to glass ceramic appears black in plan view and violet or brown to dark red in transparency.

For this reason, a decor coloring is utilized which is black-brown in order not to alter the design impression of the undecorated glass ceramic which is desired by the apparatus manufacturer and which has been accepted already by the customers.

Thereafter, the glass plate decorated with the first coloration layer applied by the screen printing process is dried in air or, for example, at 85° C. for approximately 3 minutes.

Figure 1B:
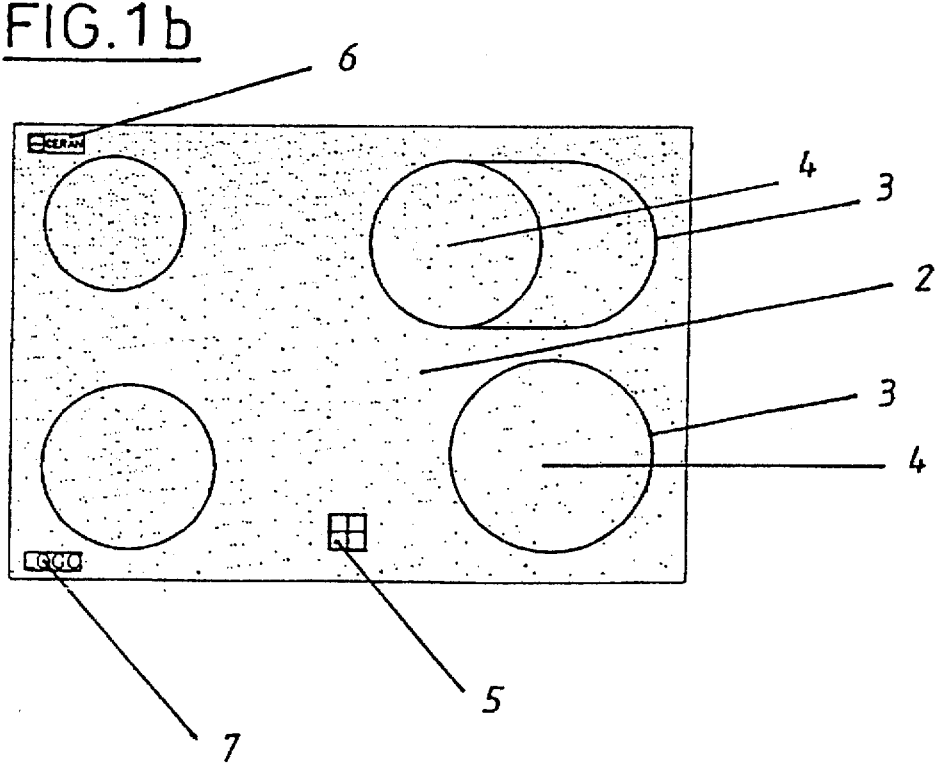
FIG. 1b is a plan view of a cooking surface having a base decor according to FIG. 1a and a further coloration layer as a marking decor.

Thereafter, and in addition to the base decor 2, a second coloration layer 3 is applied over the base decor 2 via a screen printing step. The second coloration layer 3 is a marking decor which, as shown in FIG. 1b, defines the cooking zones 4 and the residual heat displays 5 and forms legends such as a trademark 6 or a corporate logo 7. As colorations for the marking decor 3, for example, brown or green-gray are selected which clearly contrast from the base decor 2.

According to the invention, the marking decor 3 is simply printed over the base decor 2.

Thereafter, with the plate now printed twice with decor coloring, the conventional firing of the decor takes place simultaneously with the crystallization of the glass plate to a glass-ceramic plate.

Figure 2A:
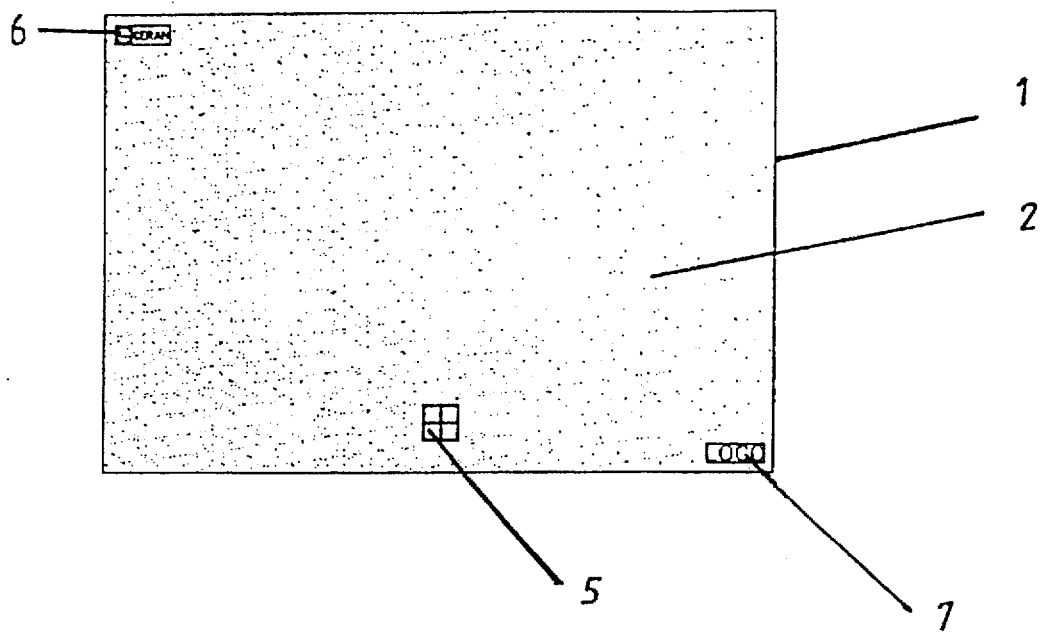
FIG. 2a is a plan view of a cooking surface having a first coloration layer as a base decor which, however, at the same time also defines function areas.
Figure 2B:
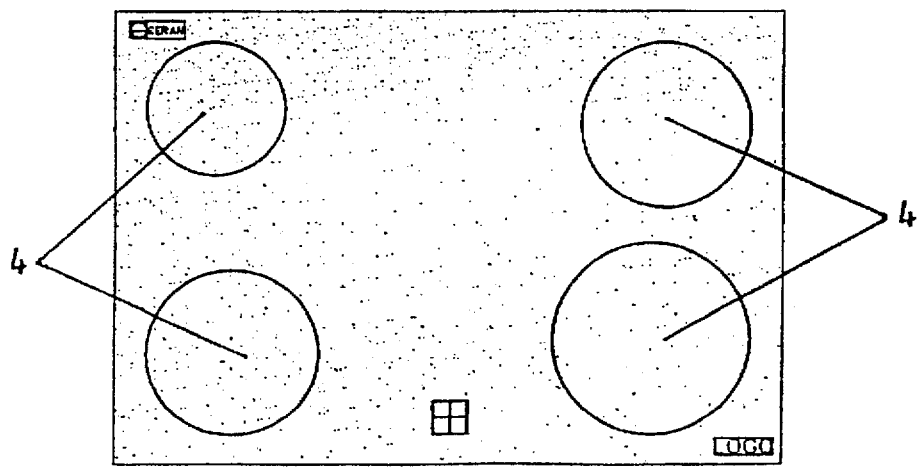
FIG. 2b is a plan view of a cooking surface according to FIG. 2a after a second screen printing wherein the second coloration layer is configured as a marking decor; and, FIG. 3 is a typical raster pattern for the base decor.

FIGS. 2a and 2b show how a three-color decor can be simulated with two screen-printing steps. As shown in FIG. 2a, with the first printing, the cooking surface 1 defined by a conventional glass (which can be crystallized to glass ceramic) is printed with a relatively dark decor color (for example, steel blue) as base decor 2. In this case, however, with the same screen and same coloring, the following are printed: a residual heat display 5, a trademark 6 and a corporate logo 7.

Figure 3:
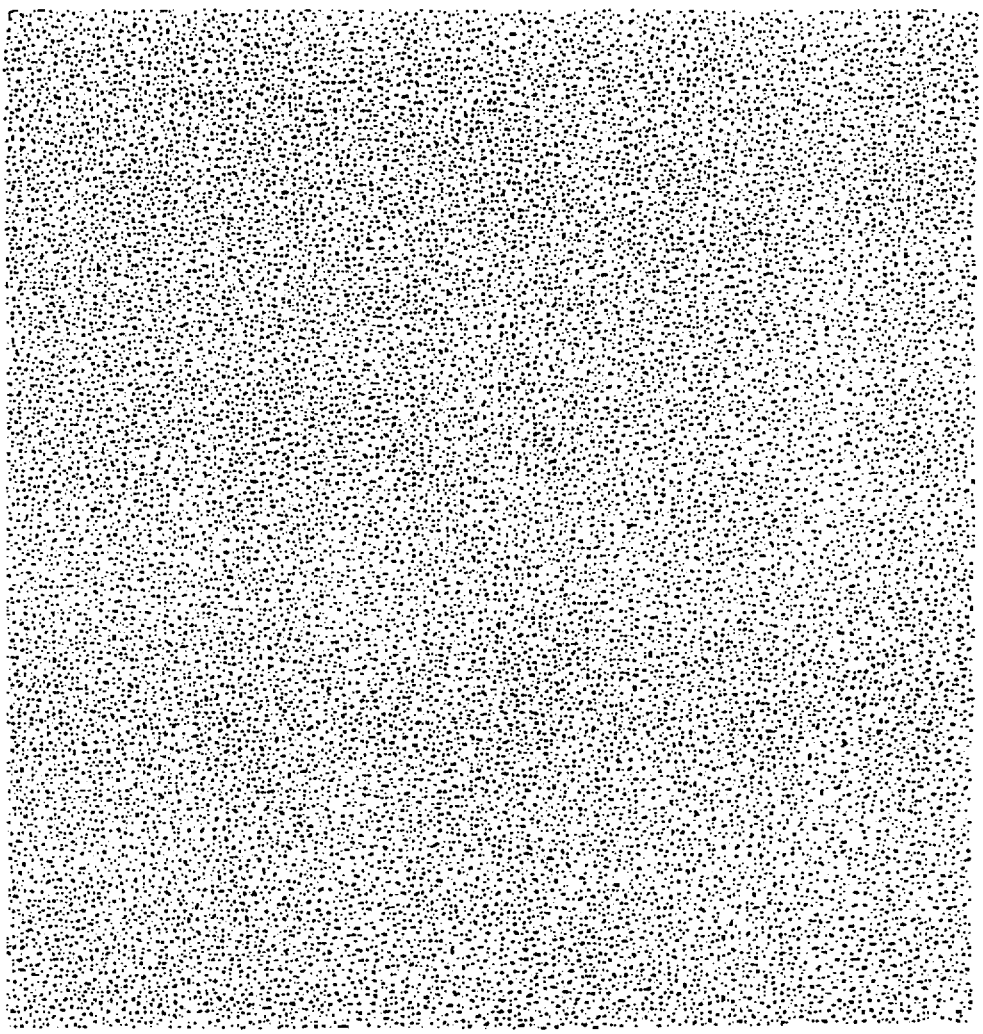

The background decor 2 is, in turn, configured to have a fine structure, for example, likewise with the decor raster "SR 326" as shown in FIG. 3.

After the first screen printing, the decorated cooking surface 1 is dried in air or at 50° C. to 90° C. for approximately 5 minutes.

A second screen printing now takes place on the already decorated cooking surface. This second screen printing is performed with another color such as white which only marks the cooking zones 4.

Thereafter, the decor is fired at approximately 950° C.

After the ceramic forming process, the plate decorated in the above manner provides the viewer with the following color impressions:

(a) the background decor 2 applied very finely structured to the dark glass-ceramic plate 1 likewise appears dark, almost black;

(b) the function areas, which are marked in solid lines, the legends and markings contrast in steel blue relative to the dark background of the plate; and, (c) the marking 4 of the cooking zones appears white.

With the invention, it is possible for the first time, to produce multicolored decorated glass-ceramic cooking surfaces having decors which in part also overlap and cross over. In summary, the advantages provided by the invention are:

(a) the base decor, which is distributed uniformly on the plate, protects the glass-ceramic cooking surface itself against surface scratches, metal abrasion and use traces;

(b) the base decor reduces furthermore the noticeability of smudging, for example, by fingerprints;

(c) the lower ace of the plate defining the cooking surface must, in part, no longer be coated in order to cover the apparatus lying beneath the cooking surface;

(d) the multicolor decor facilitates use, for example, of the cooking apparatus because of individually colored function areas which cannot be confused;

(e) the multicolor decor has a very attractive appearance; and, (f) it is simple to produce utilizing conventional methods and ceramic colorings.

It is understood that the foregoing description is that of the preferred embodiments of the invention and that various changes and modifications may be made thereto without departing from the spirit and scope of the invention as defined in the appended claims.

What is claimed is:

1. A glass-ceramic plate defining a cooking surface, the glass-ceramic plate comprising:

a glass-ceramic body;

a first coloration layer covering up to 95% of said surface to define a basic decor or pattern on said surface on said body; and, a second coloration layer on said body which at least partially overlaps said first coloration layer.

2. The glass-ceramic plate of claim 1, wherein said first coloration layer covers 5% to 80% of said surface.

3. The glass-ceramic plate of claim 1, wherein said basic decor or pattern is selected from the group consisting of: a uniform finely distributed point raster, a uniform finely distributed line raster and graphic structured units which define a repeating pattern thereof across said area.

4. The glass-ceramic plate of claim 3, wherein said glass-ceramic body provides a predetermined color impression, the color of said first coloration layer being selected to correspond approximately to said color impression.

5. The glass-ceramic plate of claim 1, wherein said first coloration layer is applied to said surface across said area with a varying thickness and density whereby said first coloration layer exhibits gradients of color intensity.

6. The glass-ceramic plate of claim 1, wherein said first coloration layer is selected from the group consisting of: functional areas on said surface, legends, symbols and other characterizations.

7. The glass-ceramic plate of claim 6, wherein said second coloration layer is configured to provide a marking pattern.

8. The glass-ceramic plate of claim 7, wherein said marking pattern is selected from the group consisting of: cooking zone markings, warm-holding zone markings, cold zone markings, work zone markings, display regions, residual heat displays, legends, symbols and other characterizations.

9. The glass-ceramic plate of claim 7, wherein said second coloration layer has a color different from the color of said basic decor or pattern.

* * * * *

UNITED STATES PATENT AND TRADEMARK OFFICE
CERTIFICATE OF CORRECTION

PATENT NO. : 5,716,712
DATED : February 10, 1998
INVENTOR(S) : Dieter Schoenig, Dietmar Wennemann, Waldemar Weinberg and Monika Cotlear de Witzmann It is certified that error appears in the above-identified patent and that said Letters Patent is hereby corrected as shown below:

```
     On the title page, under [56], FOREIGN PATENT DOCUMENTS:  add
--  195,239     9/1986     European Pat. Off.
    490,491     6/1992     European Pat. Off.
                    OTHER PUBLICATIONS
Chemical Abstracts, Volume 116, No. 10, March 9, 1992, Columbus,
    Ohio, U.S.A., Abstract No. 89797z, page 395. --

In column 1, line 36:   delete "ant" and substitute
-- and -- therefor.

In column 5, line 1:   delete "ace" and substitute
-- surface -- therefor.
```

Signed and Sealed this

Nineteenth Day of May, 1998

*Attest:*

BRUCE LEHMAN

*Attesting Officer*      Commissioner of Patents and Trademarks